United States Patent Office 3,579,688
Patented May 25, 1971

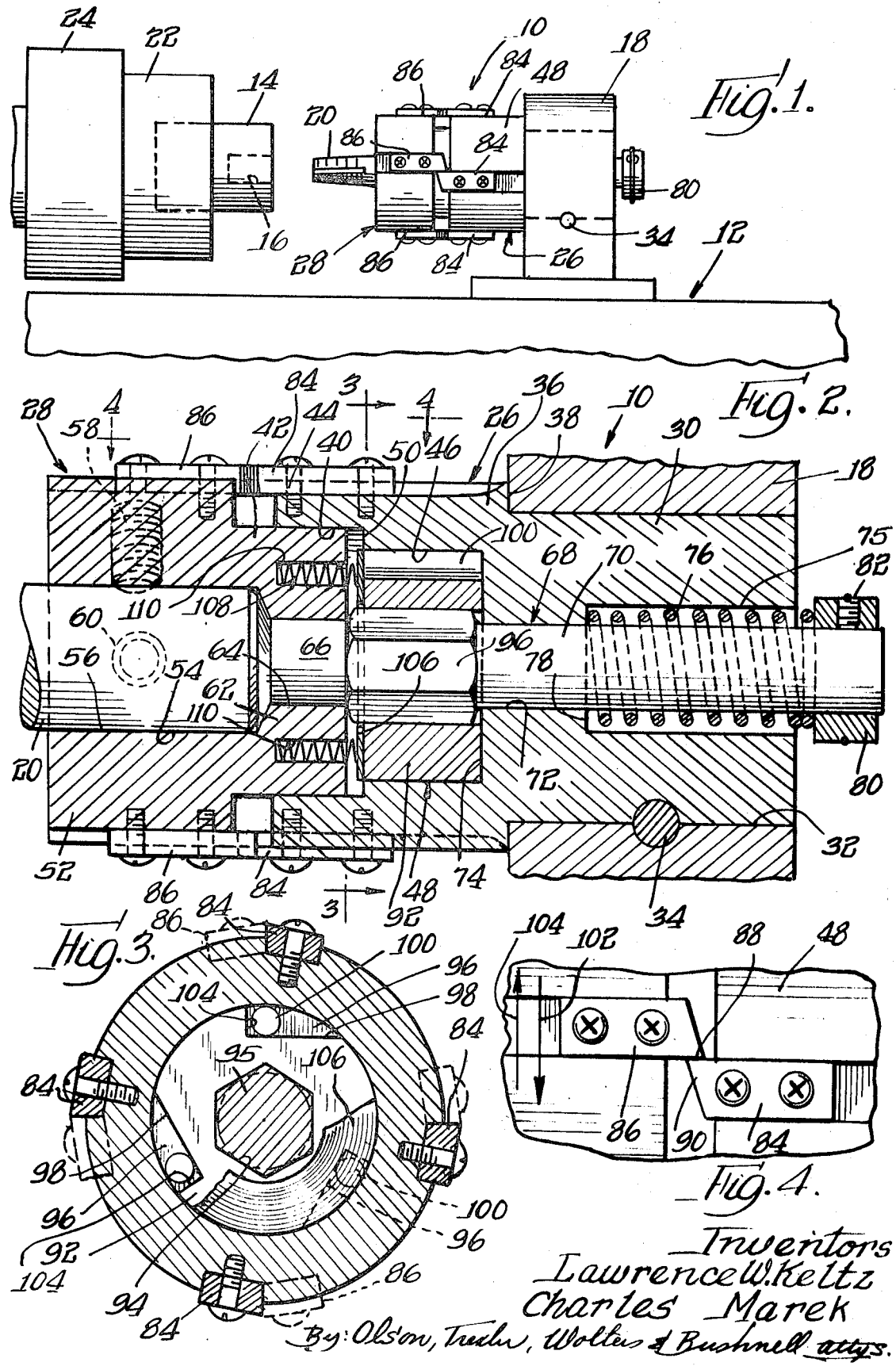

3,579,688
TAP HOLDER
Lawrence W. Keltz, Chicago, and Charles Marek, Berwyn, Ill., assignors to The Chicago Roller Skate Company, Chicago, Ill.
Filed Apr. 28, 1969, Ser. No. 819,543
Int. Cl. B23b *31/08;* B23g *5/16*
U.S. Cl. 10—134                                                       5 Claims

ABSTRACT OF THE DISCLOSURE

A tap holder assembly including relatively axially and rotatably movable parts with a one-way rotary clutch therebetween, and a spring-biased plate for maintaining elements of the clutch in proper assembled relationship during axial relative movement of the parts.

---

The present invention relates to a novel tool holder, and more specifically to a novel tap holder.

Tap holders have heretofore been suggested which include first and second members respectively adapted to be secured to the spindle or other part of the related apparatus and adapted to support the tap or other tool. Means have been provided for interconnecting such parts to permit relative axial movement therebetween in response to advancement of the tap into a workpieece. The construction has been such that after a predetermined amount of relative axial movement between the first and second members has occurred, relative rotation between such members is permitted so as to terminate advancement of the tap into the workpiece. Then the apparatus is actuated for reversing the relative rotation between the tap and the workpiece and thereby withdrawing the tap from the workpiece. The tap holder includes a one-way clutch mechanism between the aforementioned first and second members to prevent relative rotation of such members during wiethdrawal of the tap from the workpiece.

Problms have been encountered when using tap holders having the general construction described above. More specifically, during relative axial movement between the members, misalignment of elements of the clutch means occurs whereby proper operation of the mechanism is prevented.

It is an important object of the present invention to provide a novel tap holder of the above described type which is constructed for assuring the maintenance of proper relationships between the various elements whereby to assure correct and free relative movement between various elements of the tool holder throughout a tapping operation.

Other objects and advantages of the present invention will become apparent from the following description and the accompanying drawings, wherein;

FIG. 1 is a simplified view showing an apparatus for tapping an aperture in a workpiece and including a tap holder incorporating features of the present invention;

FIG. 2 is an enlarged partial fragmentary longitudinal sectional view of a tap holder incorporating features of the present invention;

FIG. 3 is a sectional view taken along line 3—3 in FIG. 2; and

FIG. 4 is a fragmentary view taken generally along line 4—4 in FIG. 2.

Referring now more specifically to the drawings wherein like parts are designated by the same numerals throughout the various figures, a tool or tap holder 10 incorporating features of the present invention is adapted to be mounted in an apparatus 12 for processing a workpiece 14 having a bore 16 therein. As will be understood, the apparatus 12 may be of various known constructions such that either the tool holder 10 or the workpiece 14 is mounted for rotation or, if desired, both the tool holder and the workpiece may be mounted for rotation relative to each other about a common axis.

In the embodiment shown, the tool holder 10 is mounted in a standard 18 which may be adjusted by suitable means, not shown, for initially axially advancing a tool or tap 20 carried by the tool holder into engagement with the workpiece 14. As will be understood a feeding screw arrangement or a variety of other known means, not shown, may be provided for advancing and retracting the standard 18 at the beginning and the end of a tapping operation. The workpiece 14 is secured by a suitable chuck 22 of known construction mounted on a rotatable spindle 24 which is adapted to be driven by suitable motor and drive transmission means of known construction so that it need not be shown. As will be understood, and as described more in detail below, the tool holder 10 and the apparatus 12 are such that the taping operation is accomplished by initially relatively axially shifting the workpiece and tap 20 into engagement with each other and rotating the workpiece so that the tap is caused to thread itself into the bore 16. After the tap has entered the desired amount, relative rotation between the tap and the workpiece is reversed so that the tap is withdrawn from the threaded aperture.

As shown best in FIG. 2, the tool or tap holder 10 comprises a first main body member 26 adapted to be mounted in the support or standard 18 and a second body member 28 adapted to receive and retain the tap or tool 20. More specifically, the body member 26, in the embodiment shown, comprises a reduced diameter shank portion 30 adapted to fit within an aperture 32 in the support member or standard 18. A pin or other suitable means 34 is provided for releasably securing the body member 26 with respect to the support 18. An enlarged outer end portion 36 of the body member 26 presents a radially extending shoulder 38 adapted to abut the support member 18.

A bore 40 is formed in an outer end of the enlarged portion 36 for axially slidably and rotatably receiving a reduced diameter portion 42 of the body member 28. The bore 40 which is defined by an annular flange 44 communicates with a counterbore 46 formed in the body member 26 for housing a one-way mechanism 48 which will be described in detail below. A step or annular shoulder 50 is formed in the body member 26 between the walls of the bores 40 and 46.

The body member 28 has an enlarged outer end portion 52 in which a bore 54 is formed for receiving a shank portion 56 of the tool or tap 20. Set screws 58 and 60 are threaded through apertures in the wall of the end portion 52 for removably securing the tap in the bore 54.

The inner end of the body member 28 comprises an annular flange section 62 defining an aperture or bore 64 receiving an end portion 66 of a shaft 68. A force fit or other suitable means is provided between the shaft end portion 66 and the wall of the body member flange 62 so that the body member 28 is fixed with respect to and adapted to move in unison with the shaft 68.

The shaft 68 has an elongated shank portion 70 of uniform diameter extending through the body member 26 as shown in FIG. 2. The body member has a bore segment 72 intermediate its ends and providing a bearing surface having a diameter substantially the same as the diameter of the shaft shank portion 70 for slidably and rotatably receiving the shaft. The bore segment 72 extends from an intersection with the counterbore 46 and a radially extending surface or shoulder 74 rearwardly to an enlarged counterbore 75 which receives and houses a compression spring 76. The spring 76 is retained between a shoulder 78 at the junction of the bores 72 and 75 and a collar 80 removably secured to a rearwardly projecting end of the shaft by any suitable means such as a set screw 82.

Spaced around and secured to the periphery of the enlarged body member end portion 36 are ratchet teeth 84. These teeth are adapted to engage and cooperate with complementary ratchet teeth 86 similarly spaced around and secured to the periphery of the outer body member end portion 52. As shown in FIGS. 2 and 4, each pair of ratchet teeth 84 and 86 are normally disposed in axially overlapping relationship with the body member 28 is fully telescoped withint he body member 26. It is noted that the spring 76 normally biases the body member 28 toward the right as viewed in FIG. 2 or, in other words, toward the fully telescoped position.

In fully telescoped or retracted position, it is seen that corners of the teeth 84 and 86 will engage each other so as to prevent relative rotation between the body members 26 and 28 during an initial portion of a workpiece tapping operation. As the tapping operation progresses and the tool 20 continues to advance into the workpiece bore 16, the body member 28 is pulled along with the tap 20 axially outwardly relative to the body member 26 and against the action of the spring 76. Such relative axial movement continues until the corner 88 of the tooth 86 is pulled beyond the corner 90 of the tooth 84 so that the ratchet teeth are disengaged from each other whereupon the body member 28 and the tapping tool 20 are free to rotate with the workpiece 14 in one direction relative to the body member 26. This, of course, terminates relative rotation between the tool and the workpiece so that no further advancement of the tool into the workpiece takes place.

In order to withdraw the tapping tool 20 from the workpiece, the apparatus 12 is suitably actuated for reversing the rotation of the workpiece 14 relative to the tool. Since at this point of the operation, the ratchet teeth 84, 86 are no longer in engagement with each other, the aforementioned one-way clutch means 48 is included for locking the body member 28 against rotation in the opposite direction relative to the body member 26. Thus, as the reverse rotation of the workpiece 14 proceeds, the tool 20 is withdrawn from the threaded workpiece aperture.

The clutch mechanism 48 comprises an annular clutch member 92 having an external diameter for snugly and rotatably fitting within the wall of bore 46. The bore 46 and the clutch member 92 have a substantially extent so as to preclude any possibility of misalignment occurring during operation of the device. The clutch member has a noncircular aperture 94 therethrough which, in the embodiment shown, is of hexagonal configuration. This aperture snugly and axially slidably and non-rotatably receives the complementary hexagonal enlarged section 95 of the shaft 68. The hexagonal section 95 of the shaft secures the clutch member 92 against rotation relative to the outer body member 28 and the tap or tool while permitting axial relative movement between the shaft and the clutch member. The axial extent of the hexagonal shaft section 95 is substantially and preferably at least similar to the diameter of the shaft for preventing misalignment between the shaft and the clutch member during axial relative movement of these parts.

The clutch member 92 is formed with a plurality of axially extending recesses 96 spaced around the periphery thereof and each presenting a cam surface 98 progressively approaching the wall of the bore 46. Wedging elements or rollers 100 are disposed in each of the recesses 96. The rollers 100 have an axial extent substantially the same as the axial dimension of the cam member 92 and a diameter which is similar to but slightly less than the maximum distance between each cam surface 98 and the opposing portion of the wall of the bore 46 taken along a radius of the device.

When the body member 28 is rotated in one direction relative to the body member 26 and more specifically in the direction of the arrow 102 in FIG. 4, the rollers 100 are rolled back against stop surfaces 104 of the recesses 96 and do not impede such rotation. Thus, the outer body member 28 is free to rotate relative to the body member 26 so as to terminate the advancement of the tapping tool in the workpiece as described above. However, upon reverse rotation of the workpiece 14 which tends to reverse the rotary bias of the body member 28 in the direction of arrow 104 in FIG. 4, the rollers 100 roll along the cam surfaces 98 away from the stop surfaces 104 and wedge between the cam surfaces 98 and the surface of the bore 46 for locking the body member 28 with respect to the body member 26. Thus, reverse rotation of the tapping tool 20 is prevented so that upon further reverse rotation of the workpiece 14, the tool is withdrawn therefrom.

As previously indicated, during a tapping operation, the body member 28 is pulled axially outwardly from the body member 26. The body member 28 pulls the shaft 68 with it and because of the close tolerances and frictional engagement between parts, the hexagonal section 95 of the shaft tends to pull the clutch member 92 outwardly from the bore 46. The clutch member 92 in turn tends to pull the rollers 100 out of the bore 46 and this action is particularly aggravated in the event the tool holder is mounted in a vertically downwardly extending position. In the event either the clutch member 92 or the pins or rollers 100 shift axially a substantial extent out of the bore 46, there is a possibility that the pins 100 will twist or become canted within the recesses 96. If such a twisting or misalignment occurs, the parts may become jammed during withdrawal of the tap member from the workpiece so that the body member 28 cannot be returned toward its normal or retracted position relative to the body member 26. In such an event, it is necessary for a workman to disassemble the tool holder and then reassemble the parts in their proper relationship.

In order to prevent the possible relative axial displacement and misalignment of the clutch member 92 and rollers 100, an annular pressure plate 106 is forced against the outer end face of the clutch member 92 by a plurality of compression springs 108. As shown in FIG. 2, the compression springs 108 are disposed in bores 100 formed in and spaced around the end or flange portion 62 of the body member 28. While only two of the springs 108 have been shown, three or more of such springs may be provided in equally spaced relationship around the longitudinal axis of the tool holder. The pressure plate 106 is urged against the end of the clutch member 92 with sufficient force to hold the clutch member securely within the bore 46 while the body member 28 is being drawn outwardly relative to the body member 26 during a tapping operation. Furthermore, the pressure plate 106 covers the outer ends of the recesses 96 and bears against the outer ends of the rollers 100 for retaining the rollers in proper assembled relationship. The springs 108 are provided with sufficient length to maintain the plate 106 against the outer ends of the clutch member 92 and the pins 100 with the necessary force even when the body member 28 is substantially fully axially extended during a tapping operation.

While a preferred embodiment of the present invention has been shown and described herein, it is obvious that many structural details may be changed.

The invention is claimed as follows:

1. A holder for a tool such as a tap and the like comprising a first body member adapted to be held by a support, a second body member axially and rotatably shiftably assembled with said first body member and adapted to hold a tool to be turned into a workpiece, said second body member being axially movable between a first retracted position and a second axially extended position relative to said first body member during turning of the tool into a workpiece, interengageable means on said first and second body members for preventing relative rotation between said body members in one direction while said second body member is axially moving from said first position to said second position and for permitting such relative rotation in said one direction upon said second body member reaching said second extended position, and one-way clutch means for locking said first and second body members against relative rotation in an opposite direction during withdrawal of the tool from a workpiece, said clutch means including an annular clutch member axially and rotatably slidably disposed within an annular surface of said first body member, a shaft fixed to said second body member and axially slidably and nonrotatably engaging within said annular clutch member, said annular clutch member including peripherally disposed recess means partially defined by cam surface means, wedge means in said recess means and engageable between said cam surface means and the annular surface of said first body member, and pressure means disposed between said second body member and said wedge means for maintaining the wedge means within said recess means during axial movement of the second body member from said first position toward said second extended position.

2. A holder, as defined in claim 1, wherein said recess means comprises a plurality of recesses circumferentially spaced around said clutch member, said wedge means comprises elongated rollers respectively disposed in said recesses, and said pressure means comprises an annular plate member overlying an end face of aid clutch member and adjacent ends of said rollers.

3. A holder, as defined in claim 2, wherein said pressure means comprises compression spring means disposed between said plate member and said second body member.

4. A holder, as defined in claim 2, wherein said annular surface, said clutch member and said rollers have a predetermined substantial axial lentgh, said clutch member having a central aperture therethrough of substantially uniform non-circular transverse cross-section, said shaft including a portion within said annular clutch member, said portion having a complementary non-circular cross-sectional configuration and an axial length similar to the length of said clutch member.

5. A holder, as defined in claim 4, wherein said shaft extends through said first body member, and spring means between said shaft and said first body member for resiliently biasing said shaft and the second body member toward said first retracted position.

References Cited

UNITED STATES PATENTS

| | | | |
|---|---|---|---|
| 2,147,203 | 2/1939 | Kylin | 10—89 |
| 2,184,779 | 12/1939 | Kiehne | 10—89 |
| 2,356,669 | 8/1944 | Hook | 10—129 |
| 2,591,291 | 4/1952 | Raymond | 10—129 |
| 2,723,406 | 11/1955 | Angst | 10—89 |
| 2,784,429 | 3/1957 | Jones | 10—89 |
| 2,858,553 | 11/1958 | Bearhalter | 10—89 |

FOREIGN PATENTS

| | | | |
|---|---|---|---|
| 369,650 | 5/1963 | Switzerland | 10—89 |

RICHARD J. HERBST, Primary Examiner

E. M. COMBS, Assistant Examiner

U.S. Cl. X.R.

10—89, 129, 141; 408—239